(12) United States Patent
Grover et al.

(10) Patent No.: US 10,982,770 B2
(45) Date of Patent: Apr. 20, 2021

(54) HYDROSTATIC SEAL WITH EXTENDED HOUSING

(71) Applicant: United Technologies Corporation, Farmington, CT (US)

(72) Inventors: Eric A. Grover, Tolland, CT (US); Brian F. Hilbert, Coventry, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 65 days.

(21) Appl. No.: 16/239,242

(22) Filed: Jan. 3, 2019

(65) Prior Publication Data

US 2020/0217422 A1    Jul. 9, 2020

(51) Int. Cl.
*F01D 11/02* (2006.01)
*F16J 15/44* (2006.01)
*F01D 11/00* (2006.01)

(52) U.S. Cl.
CPC ........... *F16J 15/441* (2013.01); *F01D 11/003* (2013.01)

(58) Field of Classification Search
CPC ......... F01D 11/003; F01D 11/08; F16J 15/44; F16J 15/441
See application file for complete search history.

(56) References Cited

U.S. PATENT DOCUMENTS

| | | |
|---|---|---|
| 1,187,212 A | 6/1916 | Westinghouse |
| 3,594,010 A | 7/1971 | Warth |
| 3,847,403 A | 11/1974 | Thiesler et al. |
| 4,017,088 A | 4/1977 | Lerjen |
| 4,213,656 A | 7/1980 | Olschewski et al. |
| 4,428,587 A | 1/1984 | Forch |
| 4,998,739 A | 3/1991 | Weiler |
| 5,626,347 A | 5/1997 | Ullah |
| 6,250,640 B1 | 6/2001 | Wolfe et al. |
| 6,338,490 B1 | 1/2002 | Bainachi |
| 6,669,443 B2 | 12/2003 | Burnett et al. |
| 7,410,173 B2 | 8/2008 | Justak |
| 7,896,352 B2 | 3/2011 | Justak |
| 8,002,285 B2 | 8/2011 | Justak |
| 8,172,232 B2 | 5/2012 | Justak |
| 8,474,827 B2 | 7/2013 | Grondahl |
| 8,600,707 B1 | 12/2013 | El-Aini et al. |
| 8,641,045 B2 | 2/2014 | Justak |
| 8,919,781 B2 | 12/2014 | Justak |

(Continued)

FOREIGN PATENT DOCUMENTS

| | | |
|---|---|---|
| EP | 3009611 A1 | 4/2016 |
| EP | 3009612 A1 | 4/2016 |

(Continued)

OTHER PUBLICATIONS

European Search Report Application No. 19220241.4; dated Jun. 17, 2020.

(Continued)

*Primary Examiner* — Gilbert Y Lee
(74) *Attorney, Agent, or Firm* — Cantor Colburn LLP

(57) ABSTRACT

A hydrostatic seal configured to be disposed between relatively rotatable components. The seal includes a base. The seal also includes a shoe operatively coupled to the base and extending axially from a forward end to an aft end to define an axial length.

16 Claims, 2 Drawing Sheets

(56) References Cited

U.S. PATENT DOCUMENTS

| | | |
|---|---|---|
| 9,045,994 B2 | 6/2015 | Bidkar et al. |
| 9,115,810 B2 | 8/2015 | Bidkar et al. |
| 9,255,642 B2 | 2/2016 | Bidkar et al. |
| 9,359,908 B2 | 6/2016 | Bidkar et al. |
| 9,587,746 B2 | 3/2017 | Bidkar et al. |
| 9,988,921 B2 * | 6/2018 | Wilson .................. F01D 11/00 |
| 10,030,531 B2 | 7/2018 | Peters |
| 10,094,232 B2 | 10/2018 | McCaffrey et al. |
| 10,208,615 B2 | 2/2019 | Peters |
| 10,436,051 B2 * | 10/2019 | Wilson .................. F01D 9/042 |
| 2003/0080513 A1 | 5/2003 | Kirby, III et al. |
| 2005/0200080 A1 | 9/2005 | Baghdadi et al. |
| 2008/0122183 A1 | 5/2008 | Braun et al. |
| 2008/0265513 A1 | 10/2008 | Justak |
| 2013/0234399 A1 | 9/2013 | Justak |
| 2013/0241153 A1 | 9/2013 | Garrison |
| 2014/0008871 A1 | 1/2014 | Bidkar et al. |
| 2014/0062024 A1 | 3/2014 | Bidkar et al. |
| 2014/0117624 A1 | 5/2014 | Bidkar et al. |
| 2014/0119912 A1 | 5/2014 | Bidkar et al. |
| 2015/0159498 A1 | 6/2015 | Mukhopadhyay et al. |
| 2016/0097294 A1 | 4/2016 | Wilson et al. |
| 2016/0108750 A1 * | 4/2016 | Wilson .................. F01D 25/04 277/411 |
| 2016/0109025 A1 | 4/2016 | McCaffrey et al. |
| 2016/0115804 A1 | 4/2016 | Wilson et al. |
| 2017/0248236 A1 | 8/2017 | Simpson et al. |
| 2017/0306780 A1 | 10/2017 | Peters et al. |
| 2018/0058240 A1 | 3/2018 | Chuong et al. |
| 2020/0217215 A1 | 7/2020 | Grover et al. |
| 2020/0217216 A1 | 7/2020 | Grover et al. |
| 2020/0217420 A1 | 7/2020 | Hilbert et al. |
| 2020/0217421 A1 | 7/2020 | Hilbert et al. |

FOREIGN PATENT DOCUMENTS

| | | |
|---|---|---|
| EP | 2580498 B1 | 8/2016 |
| EP | 3290756 A1 | 3/2018 |
| WO | 0155624 A1 | 8/2001 |
| WO | 2014022290 A1 | 2/2014 |
| WO | 2015147967 A1 | 10/2015 |

OTHER PUBLICATIONS

European Search Report for Application No. EP 19 21 9629.
European Search Report for Application No. EP 19 22 0248.
European Search Report Application No. EP 19 21 9645; dated Jun. 4, 2020.
U.S. Non Final Office Action dated May 15, 2020 for U.S. Appl. No. 16/239,611.
U.S. Non Final Office Action dated May 29, 2020 for U.S. Appl. No. 16/239,616.
U.S. Non-Final Office Action dated May 14, 2020 U421526US for U.S. Appl. No. 16/239,231.
U.S. Non Final Office Action dated May 29, 2020 for U.S. Appl. No. 16/239,226.
European Search Report for Application No. EP 19 21 9634; dated May 26, 2020.

* cited by examiner

HYDROSTATIC SEAL WITH EXTENDED HOUSING

BACKGROUND

Exemplary embodiments pertain to the art of gas turbine engines and, more particularly, to a hydrostatic seal having an extended housing to shorten a seal shoe.

Hydrostatic seals exhibit less leakage compared to traditional knife edge seals while exhibiting a longer life than brush seals. Some hydrostatic seals may be used between a stator and a rotor within a gas turbine engine. The hydrostatic seal is mounted to the stator to maintain a desired gap dimension between the hydrostatic seal and the rotor. The hydrostatic seal has the ability to 'track' the relative movement between the stator and the rotor throughout the engine operating profile when a pressure differential is developed across the seal.

Hydrostatic seals involve motion of a spring-attached shoe whose response is based on aerodynamic forces developed between the seal shoe and a rotor surface during operation. When properly designed, the hydrostatic seal will maintain tight clearances across the operating range of the engine. Because of the dynamic response of the seal shoe, the seal is susceptible to flutter-type events should the seal experience forcing that reinforces its motion at seal natural frequencies. Such events will compromise the behavior of the seal and lead to premature wear.

BRIEF DESCRIPTION

Disclosed is a hydrostatic seal configured to be disposed between relatively rotatable components. The seal includes a base. The seal also includes a shoe operatively coupled to the base and extending axially from a forward end to an aft end to define an axial length.

In addition to one or more of the features described above, or as an alternative, further embodiments may include that the axial length of the shoe is less than an axial length of the base.

In addition to one or more of the features described above, or as an alternative, further embodiments may include that the base is operatively coupled to a static housing structure, the static housing structure having a segment extending axially forward toward the aft end of the shoe.

In addition to one or more of the features described above, or as an alternative, further embodiments may include that the segment extending axially forward toward the aft end of the shoe abuts the aft end of the shoe.

In addition to one or more of the features described above, or as an alternative, further embodiments may include that the segment extending axially forward toward the aft end of the shoe is in close proximity to the aft end of the shoe.

In addition to one or more of the features described above, or as an alternative, further embodiments may include that the static housing structure comprises a U-shaped carrier, the carrier having a first segment extending axially rearward from a first end to a second end, the carrier having a second segment extending radially from the second end to a third end, the carrier having a third segment extending axially forward toward the aft end of the shoe.

In addition to one or more of the features described above, or as an alternative, further embodiments may include that the third segment is radially aligned with the shoe.

In addition to one or more of the features described above, or as an alternative, further embodiments may include a beam operatively coupling the shoe to the base.

In addition to one or more of the features described above, or as an alternative, further embodiments may include that the beam is one of a plurality of beams oriented parallel to each other.

Also disclosed is a seal assembly disposed in a gas turbine engine. The seal assembly includes a first component. The seal assembly also includes a second component, the first component and the second component relatively rotatable components. The seal assembly further includes a first hydrostatic seal disposed between the first component and the second component. The seal includes a base. The seal also includes a shoe operatively coupled to the base and extending axially from a forward end to an aft end to define an axial length.

In addition to one or more of the features described above, or as an alternative, further embodiments may include that the axial length of the shoe is less than an axial length of the base.

In addition to one or more of the features described above, or as an alternative, further embodiments may include that the base is operatively coupled to a static housing structure, the static housing structure having a segment extending axially forward toward the aft end of the shoe.

In addition to one or more of the features described above, or as an alternative, further embodiments may include that the segment extending axially forward toward the aft end of the shoe abuts the aft end of the shoe.

In addition to one or more of the features described above, or as an alternative, further embodiments may include that the segment extending axially forward toward the aft end of the shoe is in close proximity to the aft end of the shoe.

In addition to one or more of the features described above, or as an alternative, further embodiments may include that the static housing structure comprises a U-shaped carrier, the carrier having a first segment extending axially rearward from a first end to a second end, the carrier having a second segment extending radially from the second end to a third end, the carrier having a third segment extending axially forward toward the aft end of the shoe.

In addition to one or more of the features described above, or as an alternative, further embodiments may include that the third segment is radially aligned with the shoe.

In addition to one or more of the features described above, or as an alternative, further embodiments may include a beam operatively coupling the shoe to the base.

In addition to one or more of the features described above, or as an alternative, further embodiments may include that the beam is one of a plurality of beams oriented parallel to each other.

In addition to one or more of the features described above, or as an alternative, further embodiments may include that the first component is a stator and the second component is a rotor, the seal being operatively coupled to the stator.

Further disclosed is a gas turbine engine including a compressor section, a combustor section, a turbine section, and a seal assembly disposed in the gas turbine engine. The seal assembly includes a stator, a rotor, and a first hydrostatic seal disposed between a stator and the rotor. The seal includes a carrier operatively coupled to the stator. The seal also includes a base operatively coupled to the carrier. The seal further includes a shoe operatively coupled to the base and extending axially from a forward end to an aft end to define an axial length. The axial length of the shoe is less than an axial length of the base, the carrier having a segment extending axially forward toward the aft end of the shoe.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
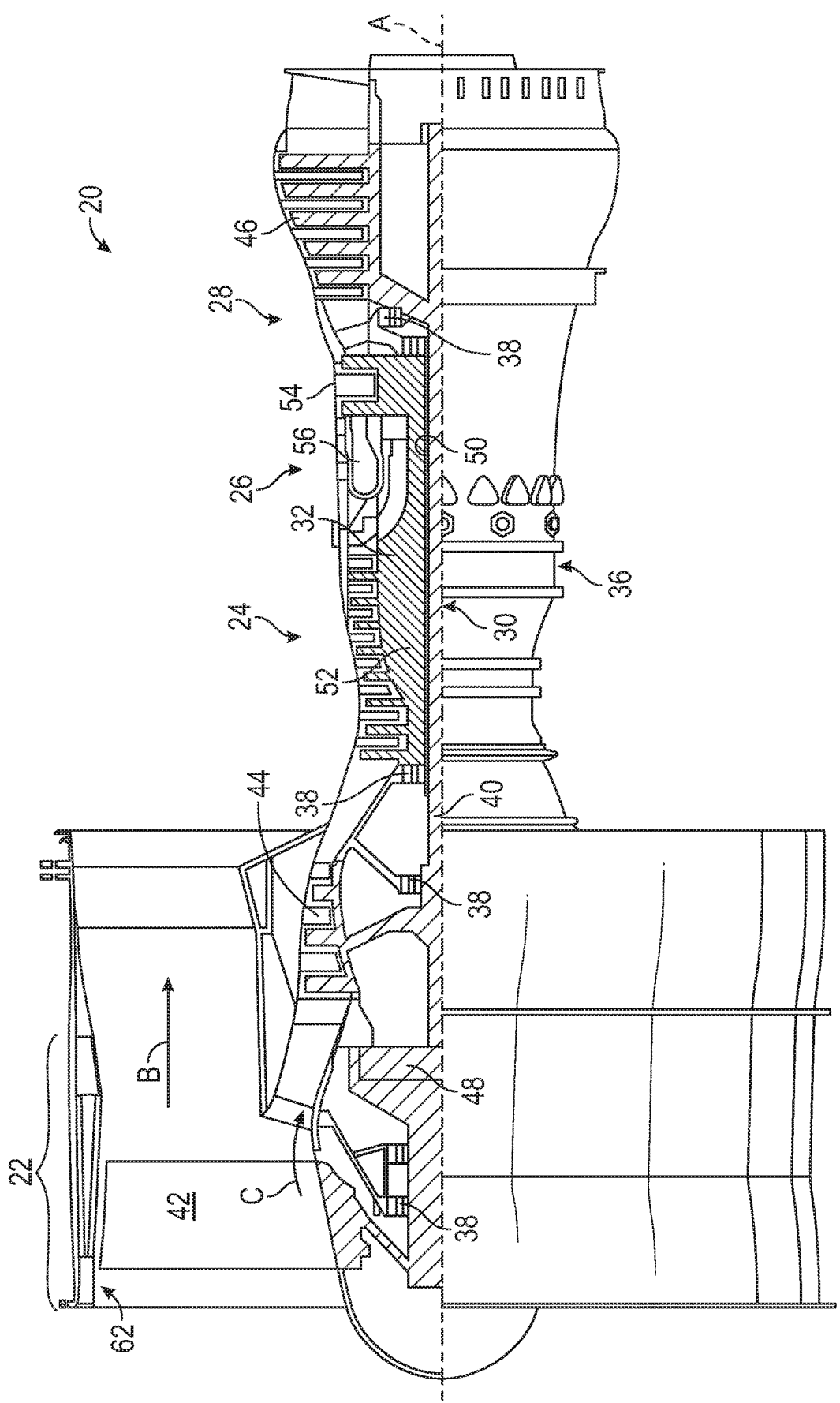
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
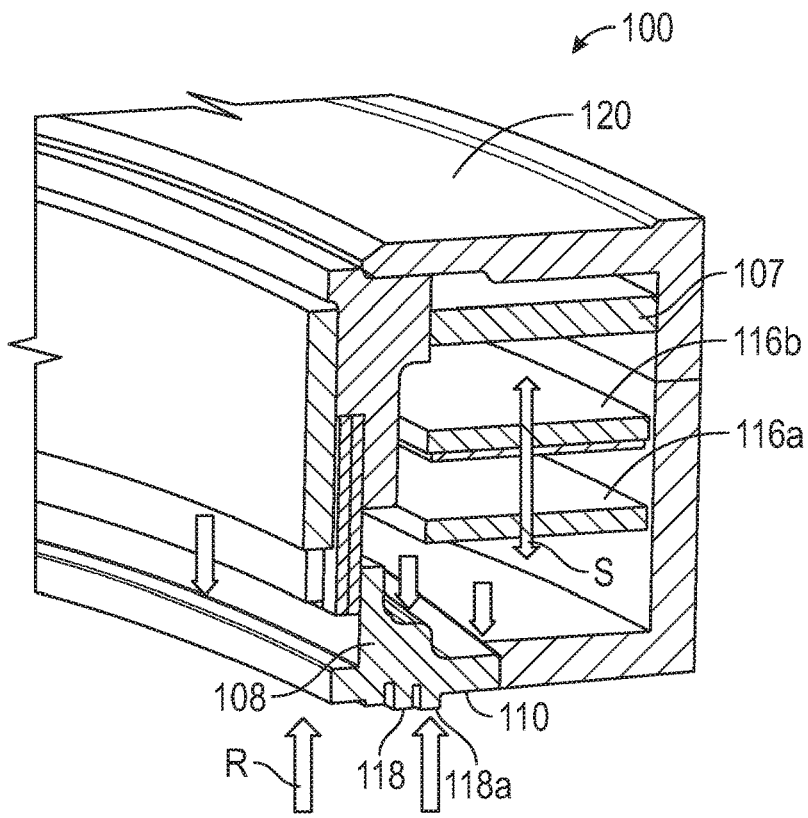
FIG. 2 is a perspective view of a portion of a hydrostatic seal assembly.
Figure 3:
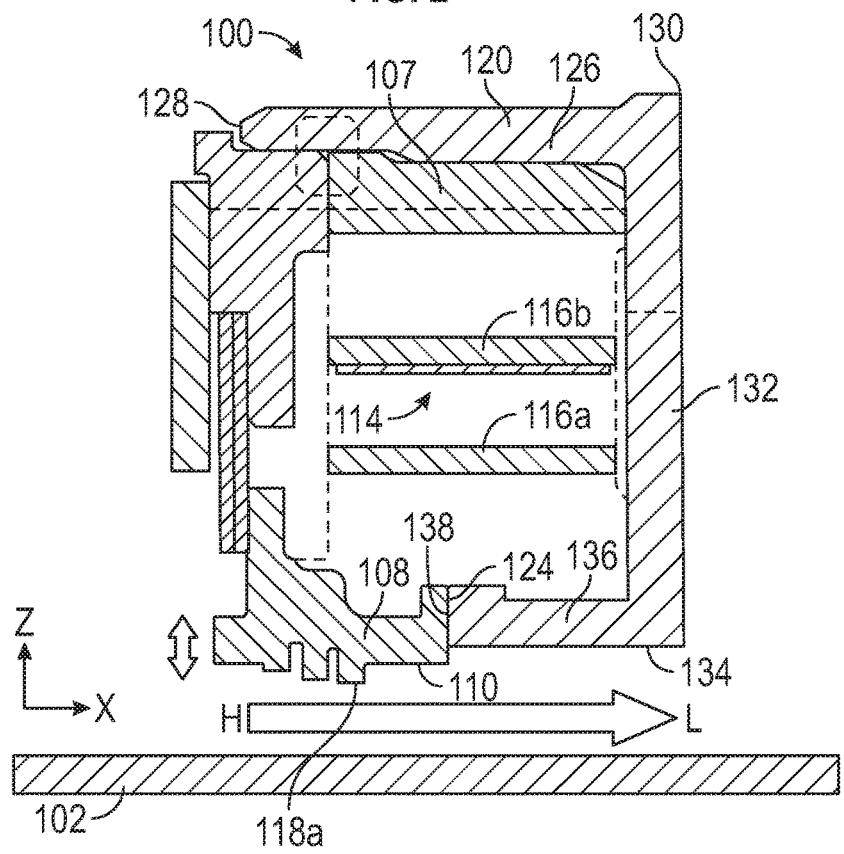
FIG. 3 is cross-sectional view of the hydrostatic seal assembly.

FIGS. 2 and 3 illustrate a hydrostatic seal indicated generally at 100. The seal 100 is intended to create a seal between two relatively rotating components, such as a fixed stator and a rotating rotor 102. The seal 100 includes a base portion 107 and at least one, but often a plurality of circumferentially adjacent shoes 108 which are located in a non-contact position along the exterior surface of the rotor 102. Each shoe 108 is formed with a sealing surface 110. For purposes of the present disclosure, the term "axial" or "axially spaced" refers to a direction along the rotational axis of the rotor, whereas "radial" refers to a direction perpendicular to the rotational axis of the rotor. FIG. 3 illustrates axial direction X and radial direction Z.

Under some operating conditions, it is desirable to limit the extent of radial movement of the shoes 108 with respect to the rotor 102 to maintain tolerances, such as the spacing between the shoes 108 and the facing surface of the rotor. The hydrostatic seal 100 includes at least one spring element 114. In the current embodiment, each spring element 114 is formed with at least one beam, though in practice other elements could be utilized to create the spring element. In the illustrated embodiment, two beams are shown, specifically an inner beam 116a and an outer beam 116b. The beams 116a, 116b connect the shoe 108 to the base portion 107 of the seal 100. The base portion 107 is fixed to a carrier 120 that is part of a static structure.

Particularly when the seal 100 is used in applications such as gas turbine engines, pressures are developed which apply an aerodynamic force to the shoe 108, which is counter-balanced by the spring 114, causing it to move radially with respect to the rotor 102. The initial assembly point has a defined radial gap between the shoe 108 and the rotating surface, with no aerodynamic forces acting upon the shoe 108. In operation, the seal 100 is used to restrict flow between a high pressure region and a lower pressure region. To assist with the flow restriction, a plurality of teeth 118 are included on the sealing surface 110 of the shoe 108. The pressure drop across the shoe 108 results in a radial force on the shoe 108 which is counter balanced by the spring 114 with spring force. In operation, when the air flow between the shoe 108 and rotor 102 increases, the pressures on the shoe 108 generally decrease. The reduction in pressures along the shoe 108 reduces the radial force acting on the shoe 108 such that the force balance between the overall aerodynamic forces on the seal shoe and the spring force S causes the shoe 108 to be pushed radially inwardly toward the rotor 102, thus decreasing the gap, until the seal reaches an equilibrium position considering the spring force of the displaced beam(s). Conversely, in operation, when the air flow between the shoe 108 and rotor 102 decreases, the pressures on the shoe 108 generally increase. The increase of radial force on the shoe 108, and its overall impact with the net aerodynamic forces on the seal shoe 108 considering the spring force S, causes the shoe 108 to move radially outwardly from the rotor 102 until the seal reaches an equilibrium position considering the spring force of the displaced beam(s).

Energy from adjacent mechanical or aerodynamic excitation sources (e.g. rotor imbalance, flow through the seal, other sections of the engine, etc.) may be transmitted to the seal 100, potentially creating a vibratory response in the seal 100. For a seal with undesirable aero-mechanical properties, the vibratory response of the shoes 108 at their natural frequencies can be self-reinforcing, causing unwanted vibration levels and possible deflection of the shoes 108. Such vibratory responses create vibratory stress leading to possible reduced life of the seal 100, and can be large enough to cause unintended deflections of the shoes 108.

Positive damping values associated with the shoe 108 is a desirable design goal. Regions of positive damping contribution are generally observed upstream of the aft tooth 118a, while regions of negative damping contribution are generally observed downstream of the aft tooth 118a. Aerodynamic damping is influenced by the phasing of the time-varying pressures on the shoe 108 relative to the motion of the shoe 108. The level of aerodynamic damping is also a function of the surface area of the shoe 108, and it has been shown that a shoe 108 having an axial length extending aft of the aft tooth 118a can promote regions of negative damping contribution.

Based on the above-described aerodynamic damping characteristics, the embodiments described herein reduce the axial length of the shoe 108, thereby reducing the axial length of the shoe 108 that extends beyond the aft tooth 118a, when compared to prior seal shoe designs. However, the length of the overall seal 100 itself may benefit from being axially longer than desired in terms of the axial length of the shoe 108. Therefore, a static structure—in contrast to the moveable shoe 108—is provided to take the structural place of the portion of the shoe that has been eliminated. In the illustrated embodiment, the carrier 120 is the static structure that is extended to reduce the length of the shoe 108, while maintaining the necessary length of the seal itself. It is contemplated that an alternative static structure could be used for this purpose instead of the carrier 120.

In the illustrated embodiment, the carrier 120 extends radially to a radial distance corresponding to that of the shoe 108, then projects axially forward to abut or be in close proximity to an aft end 124 of the shoe 108. In other words, the carrier 120 is a substantially U-shaped cross-sectional structure that includes a first segment 126 extending from a first end 128 to a second end 130, a second segment 132 extending radially from the second end 130 to a third end 134, and a third segment 136 extending axially forward from the third end 134 to a fourth end 138 that abuts or is in close proximity to the aft end 124 of the shoe 108.

The embodiments described herein improve the aero-mechanical behavior of the seal 100 with improved damping characteristics and allows for seal sizing, as necessary, without compromising seal damping characteristics. Additionally, the embodiments may allow for controlling friction characteristics of the seal 100 via specialized design of the extended seal housing (e.g., carrier 120). Sealing features may be added to the static portion of the seal 100, depending upon the seal application, which could help with the wear characteristics of the overall seal 100.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal configured to be disposed between relatively rotatable components, the seal comprising:
a base; and
a shoe operatively coupled to the base and extending axially from a forward end to an aft end to define an axial length, wherein the base is operatively coupled to a static housing structure, the static housing structure having a U-shaped carrier, the U-shaped carrier having a first segment extending axially rearward from a first end to a second end, a second segment extending radially from the second end to a third end, a third segment extending axially forward from the third end toward the aft end of the shoe.

2. The seal of claim 1, wherein the axial length of the shoe is less than an axial length of the base.

3. The seal of claim 1, wherein the third segment extending axially forward toward the aft end of the shoe abuts the aft end of the shoe.

4. The seal of claim 1, wherein the third segment extending axially forward toward the aft end of the shoe is in close proximity to the aft end of the shoe.

5. The seal of claim 1, wherein the third segment is radially aligned with the shoe.

6. The seal of claim 1, further comprising a beam operatively coupling the shoe to the base.

7. The seal of claim 6, wherein the beam is one of a plurality of beams oriented parallel to each other.

8. A seal assembly disposed in a gas turbine engine, the seal assembly comprising:
a first component;
a second component, the first component and the second component relatively rotatable components; and
a first hydrostatic seal disposed between the first component and the second component, the seal comprising:
a base; and
a shoe operatively coupled to the base and extending axially from a forward end to an aft end to define an axial length, wherein the base is operatively coupled to a static housing structure, the static housing structure having a U-shaped carrier, the U-shaped carrier having a first segment extending axially rearward from a first end to a second end, a second segment extending radially from the second end to a third end, a third segment extending axially forward from the third end toward the aft end of the shoe.

9. The seal of claim 8, wherein the axial length of the shoe is less than an axial length of the base.

10. The seal assembly of claim 8, wherein the third segment abuts the aft end of the shoe.

11. The seal assembly of claim 8, wherein the third segment is in close proximity to the aft end of the shoe.

12. The seal assembly of claim 8, wherein the third segment is radially aligned with the shoe.

13. The seal assembly of claim 8, further comprising a beam operatively coupling the shoe to the base.

14. The seal assembly of claim 13, wherein the beam is one of a plurality of beams oriented parallel to each other.

15. The seal assembly of claim 8, wherein the first component is a stator and the second component is a rotor, the seal being operatively coupled to the stator.

16. A gas turbine engine comprising:
a compressor section;
a combustor section;
a turbine section; and
a seal assembly disposed in the gas turbine engine, the seal assembly comprising a stator, a rotor, and a first hydrostatic seal disposed between a stator and the rotor, the seal comprising:
a carrier operatively coupled to the stator;
a base operatively coupled to the carrier; and
a shoe operatively coupled to the base and extending axially from a forward end to an aft end to define an axial length; and
the axial length of the shoe being less than an axial length of the base, wherein the base is operatively coupled to a static housing structure, the static housing structure having a U-shaped carrier, the U-shaped carrier having a first segment extending axially rearward from a first end to a second end, a second segment extending radially from the second end to a third end, a third segment extending axially forward from the third end toward the aft end of the shoe.

* * * * *